US012118839B2

(12) United States Patent
Wong et al.

(10) Patent No.: US 12,118,839 B2
(45) Date of Patent: Oct. 15, 2024

(54) VEHICLE BLACK BOX, VEHICLE AS WELL AS METHOD OF GATHERING DATA

(71) Applicant: Rohde & Schwarz GmbH & Co. KG, Munich (DE)

(72) Inventors: Kok Meng Wong, Munich (DE); Sascha Kunisch, Munich (DE); Rajashekar Durai, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 562 days.

(21) Appl. No.: 17/178,585

(22) Filed: Feb. 18, 2021

(65) Prior Publication Data

US 2021/0264697 A1 Aug. 26, 2021

Related U.S. Application Data

(60) Provisional application No. 62/979,799, filed on Feb. 21, 2020.

(51) Int. Cl.
*G07C 5/08* (2006.01)
*B61L 15/00* (2006.01)
(Continued)

(52) U.S. Cl.
CPC .......... *G07C 5/085* (2013.01); *B61L 15/0072* (2013.01); *B61L 15/0081* (2013.01);
(Continued)

(58) Field of Classification Search
CPC ...... G07C 5/085; G07C 5/008; G07C 5/0808; B61L 15/0072; B61L 15/0081; B61L 25/02; B61L 3/008
See application file for complete search history.

(56) References Cited

U.S. PATENT DOCUMENTS

2009/0248241 A1* 10/2009 Ishii ....................... G07C 5/085 710/52
2011/0006886 A1* 1/2011 Park ....................... G07C 5/085 340/10.5
(Continued)

FOREIGN PATENT DOCUMENTS

KR 101553377 B1 * 9/2015
KR 20180024229 A * 3/2018
(Continued)

OTHER PUBLICATIONS

KR 101943625 B1, (Year: 2018), English Translation.*
(Continued)

*Primary Examiner* — Anne Marie Antonucci
*Assistant Examiner* — Connor L Knight
(74) *Attorney, Agent, or Firm* — CHRISTENSEN O'CONNOR JOHNSON KINDNESS PLLC

(57) ABSTRACT

A vehicle black box includes a sensor interface for receiving sensor data of a sensor module sensing at least one physical vehicle parameter. Further, the vehicle black box includes a wireless module for receiving a radio frequency signal, wherein the wireless module generates IQ data based on the radio frequency signal received. The vehicle black box also includes a recording module with a first memory for temporarily storing the IQ data generated and a second memory for permanently storing the IQ data generated. Moreover, the vehicle black box has a processing unit configured to receive and evaluate the sensor data. The processing unit is further configured to control a transfer of the IQ data from the first memory to the second memory based upon the evaluation result.

18 Claims, 2 Drawing Sheets

Train velocity profile between station A and B with e-brake

(51) Int. Cl.
*B61L 25/02* (2006.01)
*G07C 5/00* (2006.01)

(52) U.S. Cl.
CPC .............. *B61L 25/02* (2013.01); *G07C 5/008* (2013.01); *G07C 5/0808* (2013.01)

(56) References Cited

U.S. PATENT DOCUMENTS

| | | | | |
|---|---|---|---|---|
| 2012/0109447 | A1* | 5/2012 | Yousefi | H04W 72/541<br>701/32.2 |
| 2014/0362955 | A1* | 12/2014 | Muhammad | H04L 27/2278<br>375/343 |
| 2019/0287319 | A1* | 9/2019 | Golov | G06F 11/0796 |

FOREIGN PATENT DOCUMENTS

| | | | |
|---|---|---|---|
| KR | 20180056514 | A * | 5/2018 |
| KR | 101943625 | B1 * | 10/2018 |

OTHER PUBLICATIONS

KR 20180056514 A, (Year: 2018), English Translation.*
KR 101553377 B1, (Year: 2015), English Translation.*
KR 20180024229 A, (Year: 2018), English Translation.*

* cited by examiner

Normal train velocity profile between station A and B

Train velocity profile between station A and B with e-brake

VEHICLE BLACK BOX, VEHICLE AS WELL AS METHOD OF GATHERING DATA

CROSS-REFERENCE TO RELATED APPLICATION

This application claims the benefit of U.S. Provisional Application No. 62/979,799, filed Feb. 21, 2020, the disclosure of which is incorporated herein in its entirety.

TECHNICAL BACKGROUND

Embodiments of the present disclosure relate generally to a vehicle black box for implementation in a vehicle. Further, embodiments of the present disclosure relate generally to a vehicle with a vehicle black box. Moreover, embodiments of the present disclosure relate generally to a method of gathering data associated with at least one physical vehicle parameter.

BACKGROUND

Nowadays, many vehicles are connected wirelessly with each other or other signal emitting entities for exchanging information or for transmitting control signals. The information or the control signals may be transmitted by radio signals, for instance signals that use cellular, satellite or other proprietary protocols.

The vehicles are connected with each other or to the respective signal emitting entities for different reasons. For instance, the wireless connection is established for autonomous driving, also called self-driving, monitoring such as determining a certain position of the vehicle, infotainment such as receiving a video/audio stream and/or security reasons such as automatically initiating an emergence call when an accident occurred.

However, the number of wireless communication entities increases, namely the vehicle communicating, but also other wireless communication entities such as mobile phones, tablets or other communication devices which may be located in the vehicle. All of these wireless communication entities transmit respective radio signals which may yield interferences of the signals. An occurring interference may result in disturbances of the communication of the vehicle. Accordingly, the respective function associated with the wireless communication of the vehicle is not possible anymore.

SUMMARY

Accordingly, there is a need to monitor wireless signaling conditions and network events.

Embodiments of the present disclosure provide a vehicle black box for implementation in a vehicle. In an embodiment, the vehicle black box comprises a sensor interface for receiving sensor data of a sensor circuit or module sensing at least one physical vehicle parameter. The vehicle black box further comprises a wireless circuit or module for receiving a radio frequency signal. The wireless module generates IQ data based on the radio frequency signal received. Further, the vehicle black box has a recording circuit or module that comprises a first memory for temporarily storing the IQ data generated as well as a second memory for permanently storing the IQ data generated. In addition, the vehicle black box comprises a processing circuit or unit that is configured to receive and evaluate the sensor data. The processing unit is further configured to control a transfer of the IQ data from the first memory to the second memory based upon the evaluation result.

Moreover, embodiments of the present disclosure provide a vehicle with a vehicle black box, wherein the vehicle black box comprises:

- a sensor interface for receiving sensor data of a sensor module sensing at least one physical vehicle parameter;
- a wireless circuit or module for receiving a radio frequency signal, wherein the wireless module generates IQ data based on the radio frequency signal received;
- a recording circuit or module with a first memory for temporarily storing the IQ data generated as well as a second memory for permanently storing the IQ data generated; and
- a processing circuit or unit configured to receive and evaluate the sensor data, wherein the processing unit is further configured to control a transfer of the IQ data from the first memory to the second memory based upon the evaluation result.

Further, embodiments of the present disclosure provide a method of gathering data associated with at least one physical vehicle parameter. In an embodiment, the method comprises the steps of:

- sensing at least one physical vehicle parameter of a vehicle by a sensor circuit or module;
- receiving a radio frequency signal by a wireless circuit or module;
- generating IQ data based on the radio frequency signal received by the wireless module;
- storing the IQ data generated temporarily in a first memory of a recording circuit or module;
- receiving the sensor data by a processing circuit or unit;
- evaluating the sensor data by the processing unit; and
- controlling a transfer of the IQ data from the first memory to a second memory based upon the evaluation result by the processing unit, wherein the second memory permanently stores the IQ data generated.

Accordingly, the vehicle black box is configured to collect radio frequency signals that are received and sent by the respective vehicle by the wireless module. The wireless module generates IQ data associated with the respective radio frequency signal received, wherein the IQ data is used for further processing.

Further, the vehicle black box is configured to evaluate the respective sensor data received from the sensor module, which are associated with at least one physical vehicle parameter defining the physical behavior of the vehicle. Depending on the respective sensor data obtained via the sensor interface, the processing unit is enabled to identify a certain situation that triggers the processing unit to control the recording module to permanently store the IQ data generated. The processing unit controls the transfer of the IQ data generated from the first memory used for temporarily storing the IQ data to the second memory for permanently storing the IQ data.

In some embodiments, the processing unit has access to the recording module, for instance read access and write access, such that the processing unit copies the IQ data from the first memory into the second memory for permanently storing the IQ data. This results in the transfer of the IQ data from the first memory to the second memory.

Moreover, the processing unit controls the recording module to copy the IQ data from the first memory into the second memory for permanently storing the IQ data. This also results in the transfer of the IQ data from the first memory to the second memory.

In some embodiments, the first memory is configured to store a certain amount of IQ data that can be shifted or rather copied to the second memory based on a control signal issued by the processing unit.

The first memory may relate to a circular buffer.

Generally, the transfer of the IQ data takes place when a certain event may be detected in the sensor data processed by the processing unit.

The vehicle black box may also be called radio signal recorder, as it stores data associated with radio signals received permanently in case of an occurring event in the sensor data processed.

According to an aspect, the wireless module and the recording module are connected with each other in a signal-transmitting matter. The recording module is configured to receive the IQ data generated by the wireless module in order to store the IQ data generated in the recording module, namely temporarily in the first memory or permanently in the second memory. This depends on the evaluation result obtained by the processing unit when evaluating the sensor data.

According to another aspect, the vehicle black box comprises an outer housing that encompasses all components of the vehicle black box. Therefore, the vehicle black box is a single device that may protect its internal components from environmental impacts.

In addition, the sensor module sensing the at least physical vehicle parameter may be integrated within the vehicle black box. Thus, the sensor itself is located in the vehicle black box such that no cable is required for forwarding the sensor data to the vehicle black box. Hence, the respective sensor interface may be assigned to the processing module that communicates with the sensor module that is integrated within the vehicle black box.

In some embodiments, the sensor module sensing the at least one physical parameter is integrated within the outer housing of the vehicle black box. The sensor module is also integrated within the outer housing such that it is an internal component of the vehicle black box that is protected accordingly.

Another aspect provides that the sensor module comprises a global navigation satellite system (GNSS) sensor, a velocity sensor and/or an accelerometer. Accordingly, the sensor module may comprise different sensors that are used to sense different physical vehicle parameters of the vehicle. The sensor module may forward all information gathered to the processing unit for processing the respective data sensed in order to identify a certain trigger event that triggers the processing unit to control the transfer of the IQ data from the first memory to the second memory.

Accordingly, the at least one physical vehicle parameter may comprise a location, a distance, a velocity and/or an acceleration. The respective physical vehicle parameters defining the movement and/or position of the vehicle may be sensed by the respective sensors of the sensor module.

According to another aspect, the IQ data is transferred from the first memory to the second memory if the evaluation result indicates conspicuous sensor data. The sensor data received is evaluated by the processing unit in order to compare the sensor data with reference data, for example trained data, such that conspicuous sensor data, namely an event encompassed in the sensor data, can be identified during the evaluation process performed by the processing unit.

Moreover, the processing unit may be configured to take at least one of the time schedule or the travel path of the vehicle into account for evaluating the sensor data. For instance, a pre-defined route of the vehicle may be taken into account such as a train map of a vehicle established by a train. The vehicle black box may be programmed accordingly to obtain the information required.

For instance, the travel path comprises stations and/or distances between stations. Generally, the vehicle black box, for example its processing unit, is programmed with the travel path intended as well as any stations and the distances between the respective stations. Hence, the behavior of the vehicle can be predicted to a certain extend due to the travel path, for example the stations at which the vehicle stops and the respective distances between. For instance, the travel path may be associated with a train that follows a certain pre-defined time schedule according to a train map comprising the respective stations.

Another aspect provides that the processing unit is configured to learn non-conspicuous physical vehicle parameters, which are used by the processing unit when evaluating the sensor data. Hence, the processing unit gets trained appropriately. The training may be done previously or rather online, namely during operation. In any case, the vehicle black box, for example the processing unit, is configured to learn a normal behavior of the vehicle such that this normal behavior is taken into consideration when evaluating the sensor data in order to identify conspicuous physical vehicle parameters that trigger the processing unit to cause the transfer of the IQ data generated into the permanent memory, namely the second memory.

Thus, the processing unit may be configured to differentiate between a normal movement behavior and an abnormal movement behavior. The abnormal movement behavior may be defined by sudden or rather abrupt changes in the movement of the vehicle. For instance, this is identified by the vehicle speed and/or the acceleration of the vehicle.

Accordingly, the processing unit may be configured to differentiate between a normal movement behavior and an emergency break. The emergency break is defined by a high deceleration of the vehicle or rather a sudden decrease in velocity.

Another aspect provides that the processing unit is configured to profile a behavior of the radio signal received against the at least one physical vehicle parameter, for instance the velocity. Thus, the behavior of the radio signal received can also be taken into consideration by the vehicle black box in order to gather further information.

The vehicle may have a main wireless module for exchanging control data wirelessly. The wireless module integrated in the vehicle black box is configured to verify an interference of the main wireless module. The main wireless of the vehicle may be connected with an electronic control unit (ECU). Accordingly, the wireless module of the vehicle black box is an additional wireless module within the vehicle, which is used to verify the operation of the main wireless module.

Another aspect provides that the vehicle is autonomously operated at least partly. Since the vehicle is at least partly operated autonomously, control signals are required to control the vehicle appropriately. The main wireless module may be used to control the autonomous driving of the vehicle.

Generally, the vehicle may be a train, a car, a drone and/or a ship.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
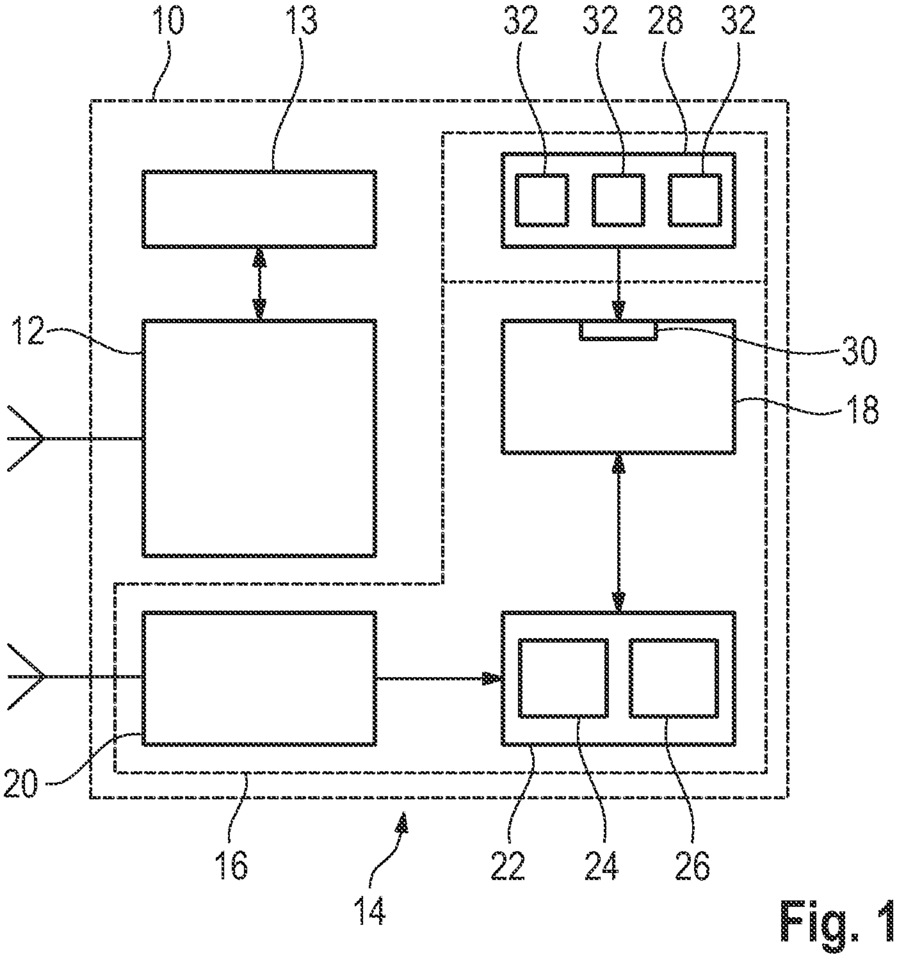
FIG. 1 schematically shows a representative embodiment of the vehicle according to the present disclosure, with a vehicle black box according to an embodiment of the present disclosure.

FIG. 1 shows a vehicle 10 that is an autonomously operated vehicle. The vehicle 10 comprises a main wireless circuit or module 12 for receiving and/or transmitting signals wirelessly. The main wireless module 12 is connected to an electronic control unit (ECU) 13 that provides the signals to be transmitted and/or processes the signals received. The signals may relate to control data used to control the movement of the vehicle 10 appropriately. The (ECU) 13 may include one or more circuits.

In addition, the vehicle 10 comprises a vehicle black box 14 that is mounted in a proximity of the main wireless module 12, ensuring that the main wireless module 12 as well as the vehicle black box 14 are exposed to the same radio frequency environment. In other words, the vehicle black box 14 and the main wireless module 12 see the same radio signals. However, a signal-transmitting connection is not provided between the main wireless module 12 and the vehicle black box 14.

The vehicle black box 14 has an outer housing 16 that encompasses internal components of the vehicle black box 14, namely a processing circuit or unit 18, a wireless circuit or module 20 as well as a recording circuit or module 22 that has a first memory 24 as well as a second memory 26. As shown in FIG. 1, the wireless module 20 is connected with the recording module 22 which in turn is connected with the processing unit 18. In addition, the vehicle black box 14 has a sensor circuit or module 28 that is connected with the processing unit 18 via a sensor interface 30.

In the shown embodiment, the processing unit 18, the wireless module 20, the recording module 22 as well as the sensor module 28 are located within the housing 16. In other words, the housing 16 encompasses the respective components mentioned above. Alternatively, the sensor module 28 may be located outside of the external housing 16 (indicated by the dashed line), wherein the connection to the processing unit 18 is established via the sensor interface 30. Thus, a cable connection or any other connection may be established between the sensor module 28 and the sensor interface 30 that is assigned to the processing unit 18.

The sensor module 28 may generally comprise different sensors 32, for instance a global navigation satellite system (GNSS) sensor, a velocity sensor and/or an accelerometer. The sensor module 28 is configured to sense at least one physical vehicle parameter of the vehicle 10. For instance, the sensor module 28 senses a location, a distance, a velocity and/or an acceleration of the vehicle 10 by the respective sensors 32.

Figure 2:
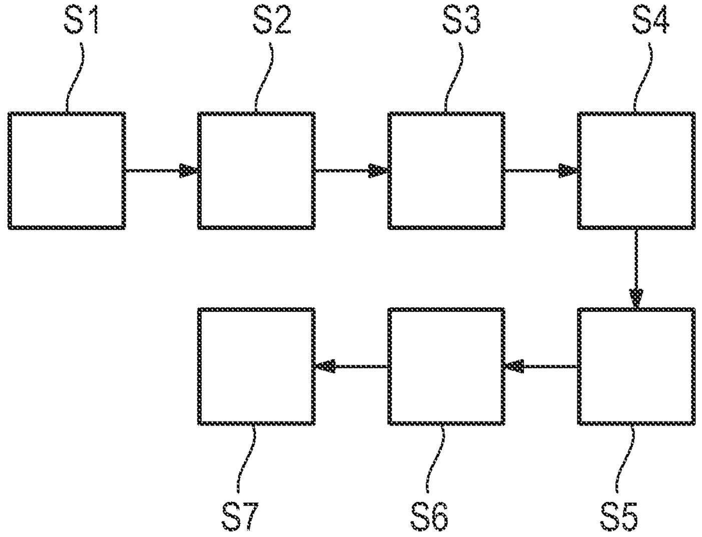
FIG. 2, shows a flow-chart illustrating a method of gathering data according to an embodiment of the present disclosure.

Hereinafter, the operation of the vehicle black box 14 is described while referring to FIG. 2 illustrating a representative method of gathering data.

In a first step S1, the at least one physical vehicle parameter of the vehicle 10 is sensed by the sensor module 28, thereby generating the sensor data.

In a second step S2, the sensor data gathered by the sensor module 28 is forwarded to the processing unit 18 via the sensor interface 30 such that the processing unit 18 receives the sensor data for further processing.

In a third step S3, the wireless module 20 receives at least one radio frequency signal, for example the same radio frequency signal that the main wireless module 12 of the vehicle 10 receives.

In a fourth step S4, the wireless module 20 generates IQ data based on the radio frequency signal received.

In a fifth step S5, the IQ data generated is forwarded to the recording module 22 for at least temporarily storing the IQ data generated. The temporarily storing of the IQ data is performed by the first memory 24 of the recording module 22.

In a sixth step S6, the processing unit 18 receives and evaluates the sensor data forwarded from the sensor module 28.

In a seventh step S7, the processing unit 18 controls a transfer of the IQ data from the first memory 24 to the second memory 26 based upon the evaluation result of the sensor data. Thus, the processing unit 18 triggers a transfer of the IQ data from the first memory 24 to the second memory 26, ensuring that the respective IQ data is stored permanently.

For instance, the processing unit 18 copies the IQ data from the first memory 24 to the second memory 26 if the evaluation result indicates conspicuous sensor data, namely an event within the sensor data. This means that the sensor data differentiates from a normal movement behavior of the vehicle 10, as the event identified corresponds to an abnormal movement behavior.

Figure 3:
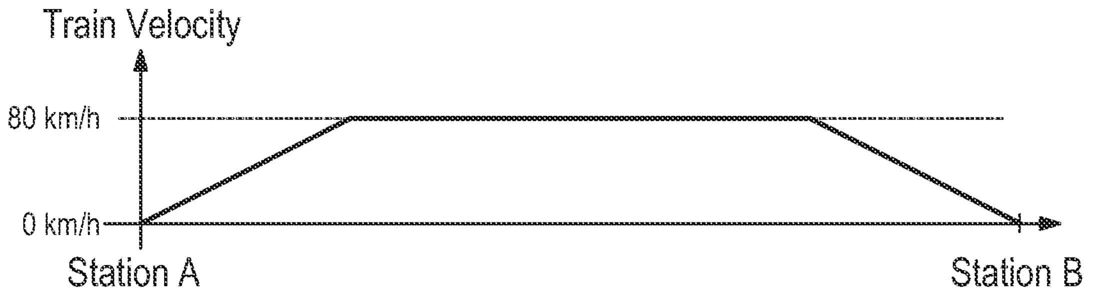
FIG. 3 shows a graph illustrating a normal movement behavior of the vehicle.
Figure 4:
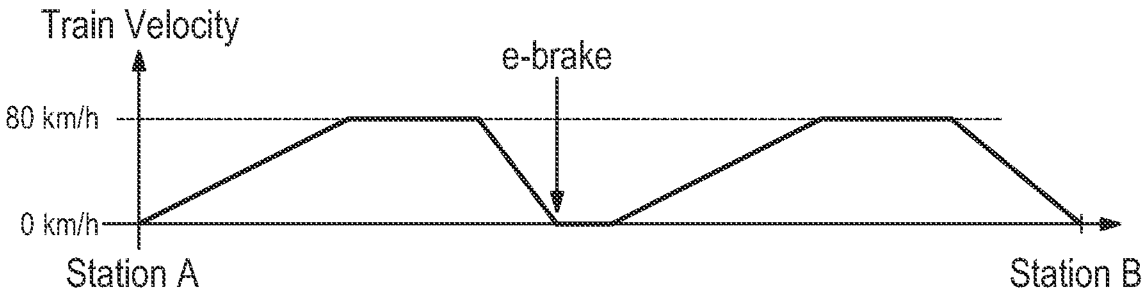
FIG. 4 shows a graph illustrating an abnormal movement behavior of the vehicle.

This is illustrated in FIGS. 3 and 4, wherein FIG. 3 shows a normal movement behavior of the vehicle 10 in contrast to FIG. 4 illustrating an abnormal movement behavior since an emergency brake ("e-brake") was performed.

The vehicle black box 14 is configured to identify such an abnormal movement behavior, wherein this triggers the processing unit 18 to control the transfer of the IQ data from the first memory 24 to the second memory 26.

For evaluating purposes of the sensor data that may encompass the velocity as shown in FIGS. 3 and 4, the processing unit 18 may take a time schedule of the vehicle 10, namely a train, and/or the travel path of the vehicle 10 into account. The travel path comprises stations, for instance "station A" and "station B", and/or distances between the respective stations.

The processing unit 18 can evaluate the sensor data by taking the information of the time schedule and/or the travel path into account. Accordingly, a typical time schedule associated with a normal movement behavior of the vehicle 10 is used as reference data when evaluating the sensor data received from the sensor module 28.

The processing unit 18 is generally configured to identify an abnormal movement behavior of the vehicle 10. In other words, the processing unit 18 can differentiate between a normal movement behavior and an abnormal movement behavior, for instance an emergency break.

It is to be noted that an intermediate stop does not necessarily relate to an abnormal behavior even though it might be unexpected. If the intermediate stop is initiated with a certain velocity profile relating to an intended deceleration, the processing unit 18 will not be triggered.

However, if an intermediate stop occurs with a rapid decrease of the velocity or any other physical vehicle parameter, the processing unit 18 will be triggered in order to control the transfer of the IQ data from the first memory 24 to the second memory 26 for permanently storing the IQ data.

In order to differentiate between the normal movement behavior and the abnormal movement behavior, the vehicle black box 14 is programmed with the respective data, for example data associated with expected movement behaviors, namely normal deceleration behaviors.

In operation of the vehicle 10, the vehicle black box 14 will record a normal movement behavior continuously such that the vehicle black box 14, for example the processing unit 18, can learn or be trained with respect to the normal acceleration pattern and deceleration pattern as well as the respective velocity pattern associated therewith.

In addition, the processing unit 18 may also be configured to profile the behavior of the radio signal against at least one physical vehicle parameter sensed by the sensor module 28. For instance, the radio signal behavior is profiled against the velocity of the vehicle 10.

In general, it is ensured that wireless signaling conditions and network events of the vehicle 10, for example its main wireless module 12, is monitored by the vehicle black box 14, wherein IQ data associated with a radio signal received is permanently stored in case of an event detected in the sensor data provided by the sensor module 28.

Certain embodiments disclosed herein, including the respective "modules," "units," etc., utilize circuitry (e.g., one or more circuits) in order to implement standards, protocols, methodologies or technologies disclosed herein, operably couple two or more components, generate information, process information, analyze information, generate signals, encode/decode signals, convert signals, transmit and/or receive signals, control other devices, etc. Circuitry of any type can be used. It will be appreciated that the term "information" can be use synonymously with the term "signals" in this paragraph. It will be further appreciated that the terms "circuitry," "circuit," "one or more circuits," etc., can be used synonymously herein.

In an embodiment, circuitry includes, among other things, one or more computing devices such as a processor (e.g., a microprocessor), a central processing unit (CPU), a digital signal processor (DSP), an application-specific integrated circuit (ASIC), a field-programmable gate array (FPGA), a system on a chip (SoC), or the like, or any combinations thereof, and can include discrete digital or analog circuit elements or electronics, or combinations thereof.

In an embodiment, circuitry includes hardware circuit implementations (e.g., implementations in analog circuitry, implementations in digital circuitry, and the like, and combinations thereof). In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes an implementation comprising one or more processors or portions thereof and accompanying software, firmware, hardware, and the like.

In some examples, the functionality described herein can be implemented by special purpose hardware-based computer systems or circuits, etc., or combinations of special purpose hardware and computer instructions.

Of course, in some embodiments, two or more of the components described above, or parts thereof, can be integrated or share hardware and/or software, circuitry, etc. In some embodiments, these components, or parts thereof, may be grouped in a single location or distributed over a wide area. In circumstances were the components are distributed, the components are accessible to each other via communication links.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The invention claimed is:

1. A vehicle black box for implementation in a vehicle, said vehicle black box comprising:

a sensor interface configured to receive sensor data from a sensor circuit sensing at least one physical vehicle parameter defining a physical behavior of said vehicle that is autonomously operated at least partly, wherein said at least one physical vehicle parameter comprises at least one of velocity or acceleration;

a wireless circuit configured to receive radio frequency signals that are received and sent by a main wireless circuit of said vehicle, said wireless circuit configured to generate in-phase and quadrature (IQ) data based on said radio frequency signals received;

a recording circuit comprising a first memory for temporarily storing said IQ data generated and a second memory for permanently storing said IQ data generated;

a processing circuit configured to receive and evaluate said sensor data, said processing circuit being further configured to identify an abnormal movement behavior that triggers said processing circuit to control a transfer of said IQ data from said first memory to said second memory based upon an evaluation result, wherein the transfer of the IQ data takes place when a certain event is detected in the sensor data processed by said processing circuit; and data associated with expected movement behaviors, wherein said processing circuit is configured to: access said data associated with expected movement behaviors; compare said sensor data with said data associated with expected movement behaviors in order to identify the certain event during an evaluation process; and differentiate between the abnormal movement behavior and a normal movement behavior derived from said data associated with the expected movement behaviors.

2. The vehicle black box according to claim 1, wherein said wireless circuit and said recording circuit are connected with each other in a signal-transmitting matter.

3. The vehicle black box according to claim 1, wherein said vehicle black box comprises an outer housing encompassing all components of said vehicle black box.

4. The vehicle black box according to claim 3, wherein said sensor circuit sensing said at least one physical vehicle parameter is integrated within said outer housing of said vehicle black box.

5. The vehicle black box according to claim 1, wherein said sensor circuit sensing said at least one physical vehicle parameter is integrated within said vehicle black box.

6. The vehicle black box according to claim 1, wherein said sensor circuit comprises at least one of a global navigation satellite system (GNSS) sensor, a velocity sensor, and an accelerometer.

7. The vehicle black box according to claim 1, wherein said IQ data is transferred from said first memory to said second memory if said evaluation result indicates conspicuous sensor data.

8. The vehicle black box according to claim 1, wherein said processing circuit is configured to take a time schedule and a travel path of said vehicle into account for evaluating said sensor data.

9. The vehicle black box according to claim 8, wherein said travel path comprises at least one of stations and distances between stations.

10. The vehicle black box according to claim 1, wherein said processing circuit is configured to learn non-conspicuous physical vehicle parameters, which are used by said processing circuit when evaluating said sensor data.

11. The vehicle black box according to claim 1, wherein said processing circuit is configured to differentiate between a normal movement behavior and an emergency brake.

12. The vehicle black box according to claim 1, wherein said processing circuit is configured to profile a behavior of said radio signal received against said at least one physical vehicle parameter.

13. The vehicle black box according to claim 1, wherein said vehicle black box is capable of recording the normal movement behavior continuously during operation of said vehicle such that said processing circuit is enabled to learn or be trained normal acceleration patterns and normal deceleration patterns as well as respective velocity patterns associated therewith.

14. The vehicle black box according to claim 1, further comprising the sensor circuit that generates the sensor data by sensing the at least one physical vehicle parameter.

15. A vehicle with a vehicle black box and a main wireless circuit, said vehicle black box comprising:

a sensor interface configured to receive sensor data from a sensor circuit sensing at least one physical vehicle parameter defining a physical behavior of said vehicle, wherein said at least one physical vehicle parameter comprises at least one of velocity or acceleration;

a wireless circuit configured to receive radio frequency signals that are received and sent by the main wireless circuit of said vehicle, said wireless circuit configured to generate in-phase and quadrature (IQ) data based on said radio frequency signal received;

a recording circuit comprising a first memory for temporarily storing said IQ data generated and a second memory for permanently storing said IQ data generated; and a processing circuit configured to receive and evaluate said sensor data, said processing circuit having an evaluation sub-circuit and a control sub-circuit, wherein said evaluation sub-circuit is configured to take a pre-defined route of said vehicle into account and to identify an abnormal movement behavior that triggers said control sub-circuit to control a transfer of said IQ data from said first memory to said second memory based upon an evaluation result, wherein the wireless circuit is configured to collect radio frequency signals that are received or sent by the vehicle, wherein said vehicle black box further comprises data associated with expected movement behaviors due to said pre-defined route of said vehicle, wherein said processing circuit is configured to access said data and to differentiate between the abnormal movement behavior and a normal movement behavior derived from said data associated with the expected movement behaviors, wherein said vehicle is an at least partly autonomously operated vehicle, wherein said main wireless circuit is configured to wirelessly receive control data used to control a movement of said vehicle, and wherein said wireless circuit is integrated in said vehicle black box and is configured to verify an interference of said main wireless circuit.

16. The vehicle according to claim 15, wherein said vehicle black box is capable of recording the normal movement behavior continuously during operation of said vehicle such that said processing circuit is enabled to learn or be trained normal acceleration patterns and normal deceleration patterns as well as respective velocity patterns associated therewith.

17. The vehicle according to claim 15, further comprising the sensor circuit that generates the sensor data by sensing the at least one physical vehicle parameter.

18. A method of gathering data associated with at least one physical vehicle parameter, said method comprising:

sensing, by a sensor circuit, at least one physical vehicle parameter of a vehicle defining a physical behavior of said vehicle that is autonomously operated at least partly, thereby generating sensor data, wherein said at least one physical vehicle parameter comprises at least one of velocity or acceleration;

receiving, by a wireless circuit, a radio frequency signal, wherein the radio frequency signal is received or sent by the vehicle;

generating, by said wireless circuit, in-phase and quadrature (IQ) data based on said radio frequency signal received;

storing said IQ data generated temporarily in a first memory of a recording circuit;

receiving, by a processing circuit, said sensor data;

evaluating, by said processing circuit, said sensor data;

identifying, by said processing circuit, an abnormal movement behavior that triggers the processing circuit to control a transfer of said IQ data, wherein said processing circuit accesses data associated with expected movement behaviors and differentiates between the abnormal movement behavior and a normal movement behavior derived from said data associated with the expected movement behaviors; and controlling, by said processing circuit, said transfer of said IQ data from said first memory to a second memory based upon an evaluation result, said second memory permanently storing said IQ data generated.

* * * * *